(12) United States Patent
Shortlidge et al.

(10) Patent No.: US 8,161,724 B2
(45) Date of Patent: Apr. 24, 2012

(54) HYBRID BIOMASS PROCESS WITH REHEAT CYCLE

(75) Inventors: Seth Shortlidge, St. Augustine, FL (US); Gregory J. Cahill, Braintree, MA (US)

(73) Assignee: EIF NTE Hybrid Intellectual Property Holding Company, LLC, Needham, MA (US)

( * ) Notice: Subject to any disclaimer, the term of this patent is extended or adjusted under 35 U.S.C. 154(b) by 0 days.

(21) Appl. No.: 12/957,719

(22) Filed: Dec. 1, 2010

(65) Prior Publication Data
US 2011/0140453 A1    Jun. 16, 2011

Related U.S. Application Data

(63) Continuation-in-part of application No. 12/751,830, filed on Mar. 31, 2010.

(51) Int. Cl.
   *F02C 6/00*   (2006.01)
   *F01K 7/34*   (2006.01)

(52) U.S. Cl. ............ 60/39.182; 60/653; 60/677; 60/679

(58) Field of Classification Search ............... 60/39.182, 60/653, 677–679
See application file for complete search history.

(56) References Cited

U.S. PATENT DOCUMENTS

| | | |
|---|---|---|
| 3,937,024 A | 2/1976 | Durrant et al. |
| 4,013,877 A | 3/1977 | Uram et al. |
| 4,060,990 A | 12/1977 | Guido et al. |
| 4,069,675 A | 1/1978 | Adler et al. |
| 4,195,231 A * | 3/1980 | Reed et al. ................. 290/40 R |
| 4,288,979 A | 9/1981 | Liljedahl et al. |
| 4,326,382 A | 4/1982 | Baardson |
| 4,414,813 A | 11/1983 | Knapp |
| 4,541,247 A | 9/1985 | Martin |
| 5,319,934 A | 6/1994 | Parker, III et al. |
| 5,442,908 A | 8/1995 | Briesch et al. |
| 5,581,128 A | 12/1996 | Royle |
| 5,607,011 A | 3/1997 | Abdelmalek |
| 5,649,416 A | 7/1997 | Moore |
| 5,720,165 A | 2/1998 | Rizzie et al. |
| 5,724,807 A | 3/1998 | Schuetzenduebel et al. |
| 5,761,896 A | 6/1998 | Dowdy et al. |
| 5,822,974 A | 10/1998 | McGowin et al. |
| 6,065,280 A | 5/2000 | Ranasinghe et al. |
| 6,116,017 A | 9/2000 | Mori et al. |
| 6,244,039 B1 | 6/2001 | Sugishita et al. |

(Continued)

OTHER PUBLICATIONS

Mouawad, JAD, "The Newest Hybrid Model", New York Times, 2 pages, Mar. 4, 2010.

(Continued)

*Primary Examiner* — Hoang Nguyen
(74) *Attorney, Agent, or Firm* — Pierce Atwood LLP; Joseph M. Maraia; Christopher E. Everett

(57) ABSTRACT

Methods and systems for the generation of electrical energy through the combination of steam flows produced from different fuel sources. Steam produced from processing of a biomass fuel source is combined with steam produced from the processing of natural gas or fossil fuel and routed through a steam turbine generator to produce electrical energy. The steam is preferably reheated after partial processing in the steam turbine generator and then recirculated for further processing in the steam turbine generators. Following extraction of all available energy from the steam, the steam is condensed to water, the feedwater is then reheated and pumped to the boilers of both energy sources for conversion into steam.

16 Claims, 2 Drawing Sheets

U.S. PATENT DOCUMENTS

| | | |
|---|---|---|
| 6,339,926 B1 | 1/2002 | Ichiro et al. |
| 6,430,914 B1 | 8/2002 | Goidich et al. |
| 6,497,102 B2 | 12/2002 | Liebig |
| 6,604,354 B2 | 8/2003 | Oto et al. |
| 6,606,848 B1 | 8/2003 | Rollins, III |
| 6,663,777 B2 | 12/2003 | Schimel |
| 6,748,733 B2 | 6/2004 | Tamaro |
| 6,817,186 B2 | 11/2004 | Tanaka |
| 6,923,004 B2 | 8/2005 | Chandran et al. |
| 6,957,540 B1 | 10/2005 | Briesch et al. |
| 6,966,190 B2 | 11/2005 | Wylie |
| 7,272,934 B2 * | 9/2007 | Chandran et al. ............... 60/781 |
| 7,299,637 B2 | 11/2007 | Becker |
| 7,331,178 B2 | 2/2008 | Goldman |
| 7,367,177 B2 | 5/2008 | Briesch |
| 7,377,107 B2 | 5/2008 | Sugioka |
| 7,596,939 B2 | 10/2009 | Kataoka et al. |
| 7,640,750 B2 * | 1/2010 | Saviharju et al. ............... 60/653 |
| 7,803,333 B2 | 9/2010 | Buchert |
| 7,841,304 B2 | 11/2010 | Van Wees et al. |
| 7,845,172 B2 | 12/2010 | Goldman |
| 8,056,316 B2 | 11/2011 | Poline |
| 2003/0136127 A1 | 7/2003 | Thiessen |
| 2005/0034445 A1 | 2/2005 | Radovich |
| 2006/0225428 A1 | 10/2006 | Brostmeyer |
| 2007/0012041 A1 | 1/2007 | Goldman |
| 2007/0084208 A1 | 4/2007 | Goldman |
| 2007/0157614 A1 | 7/2007 | Goldman |
| 2007/0271899 A1 | 11/2007 | Nakagawa et al. |
| 2008/0000237 A1 | 1/2008 | Briesch et al. |
| 2008/0000436 A1 | 1/2008 | Goldman |
| 2008/0115500 A1 | 5/2008 | MacAdam et al. |
| 2009/0031698 A1 | 2/2009 | Brown et al. |
| 2009/0094983 A1 | 4/2009 | Goto et al. |
| 2009/0183693 A1 | 7/2009 | Furman |
| 2009/0282738 A1 | 11/2009 | Tharpe, Jr. |
| 2010/0003741 A1 | 1/2010 | Fromson |
| 2011/0016789 A1 | 1/2011 | Nukumi et al. |
| 2011/0146155 A1 | 6/2011 | Bentzen |
| 2011/0209647 A1 | 9/2011 | Mitchell et al. |

OTHER PUBLICATIONS

Florida Power & Light Company's Petition for Solar Energy Projects for Recovery through Environmental Cost Recovery Clause before The Florida Public Service Commission (May 16, 2008), 21 pages.

Florida Power & Light Company's Petition for Solar Energy Projects for Recovery through Environmental Cost Recovery Clause before The Florida Public Service Commission, Direct Testimony and Exhibits of Eric Silagy (May 16, 2008), 85 pages.

International Search Report; International Searching Authority; PCT/US2011/061899; Dec. 14, 2011.

* cited by examiner

HYBRID BIOMASS PROCESS WITH REHEAT CYCLE

CROSS REFERENCE TO RELATED APPLICATION

This application is a continuation-in-part of U.S. application Ser. No. 12/751,830, filed Mar. 31, 2010, which application is incorporated by reference.

FIELD

This invention relates generally to methods and systems for the generation of electrical power through the combination of a biomass combustion system and a conventional energy system such as a natural gas or other fossil fuel combustion system. More specifically, the invention is directed at methods and systems for the combination of steam outputs from a biomass combustion cycle with the steam output of a natural gas combined cycle or other fossil fuel fired power plant to generate electrical power.

BACKGROUND

The use of biomass as a means to generate electrical power is well established in the pulp and paper industry. Biomass has also been used in standalone power generation facilities. One of the drawbacks to power generation technology using biomass as a fuel, based on the generation of steam, is the inherent low efficiency of its power generation cycle relative to that of a natural gas or other fossil fuel fired power plant. This lower level of efficiency for power generation using biomass fuel sources stems from two main deficiencies. First, the moisture content of the biomass fuel is usually above 40%, which decreases the combustion efficiency of the boiler. Second, the size of the biomass fuel fired power plant is usually less than 50 MW, which results in a less efficient steam cycle than that of a much larger natural gas or fossil fuel fired power plant. The present disclosure seeks to overcome these and other deficiencies by combining the steam generated from biomass processing with steam generated from a natural gas or other fossil fuel cycle.

SUMMARY

The present disclosure is directed to systems and methods for power generation through the combination of a biomass fuel combustion cycle and a natural gas or other fossil fuel fired cycle. In general, the hybrid cycle format utilizes the steam from the biomass boiler with the steam output from a traditional natural gas or fossil fuel fired power plant. In alternative embodiments, the steam from the biomass boiler can be combined with the steam output from a solid fuels boiler. Inefficiencies of a traditional biomass power plant are overcome through this combination.

The process for the generation of steam from the two sources is kept separate. Steam from the biomass source is combined with steam from the natural gas, other fossil fuel cycle, or solid fuel cycle and flows to a common steam turbine generator. Exemplary embodiments of the present disclosure will now be described.

In a first exemplary embodiment, an unfired 3 drum heat recovery steam generator (HRSG) is used. The combined steam flows are passed through the high pressure section of the steam turbine generator. When the plant is operating in hybrid mode with both the fossil fueled and biomass fired boilers in operation, the combined steam flow leaving the high pressure section of the steam turbine generator is routed along steam lines to two destinations. First, a portion of the steam is routed along a cold reheat steam line to the reheat section of the HRSG. The steam from the power production cycle is reheated in the HRSG. Upon exiting the reheat section of the HRSG, this reheated steam is combined with steam from the intermediate pressure drum of the HRSG. Second, a portion of the steam flow leaving the high pressure section of the steam turbine is routed along a cold reheat steam line to be reheated in the reheat section in the biomass boiler. The outputs from the reheat section of the HRSG, the intermediate pressure drum of the HRSG, and the biomass boiler reheater are then combined and routed to an intermediate pressure section of the steam turbine and then expanded to the low pressure section of the steam turbine generator to generate electrical power. Preferably, the HRSG also includes steam line outputs connected to a low pressure section of the steam turbine generator. The steam is expanded in the low pressure section to generate electrical power. The steam exiting the low pressure section of the steam turbine passes over a condenser where it is condensed to feedwater. From the condenser, the feedwater is pumped to both the HRSG and the biomass boiler for reheating and steam production.

When the plant is operating in biomass only mode, the steam flow leaving the high pressure section of the steam turbine is routed along steam lines to only one destination. The cold reheat steam from the power production cycle is routed to the reheat section of the biomass boiler. The output from the biomass boiler reheat cycle is then routed to the intermediate pressure section of the steam turbine and then expanded to the low pressure section of the steam turbine generator to generate electrical power. The steam exiting the low pressure section of the steam turbine passes over a condenser where it is condensed to feedwater. The feedwater can then be routed to the biomass boiler for heating and steam production.

In a second exemplary embodiment of the present disclosure, an unfired two drum HRSG is used. This HRSG does not have reheat capability. The combined steam flow from the natural gas cycle and the biomass boiler are directed to a high pressure section of a steam turbine generator. The steam output of the high pressure section of the steam turbine is then routed to the biomass boiler where it is reheated and then routed to the low pressure section of the steam turbine generator to generate electrical power. The steam exiting the low pressure section of the steam turbine passes over a condenser where it is condensed to a liquid feedwater. The feedwater can then be routed to the HRSG and the biomass boiler for heating and steam production.

In other exemplary embodiments of the present disclosure, other fossil fueled boilers, such as coal boilers, or other solid fuel boilers can be used in place of natural gas processing via a HRSG.

It should be noted that the figures are not drawn to scale. It also should be noted that the figures are only intended to facilitate the description of the preferred embodiments.

DETAILED DESCRIPTION

The system and methods of the present disclosure allow for more efficient energy production from biomass fuel. The enhanced efficiency of the present method is achieved by combining a typical biomass fuel cycle with a natural gas or fossil fuel cycle in a hybrid process. Steam generated from the biomass fuel cycle is combined with steam generated from the natural gas or other fossil fuel cycle and the combined steam flow is then routed through a steam turbine generator. The proposed process combusts the biomass fuel separately from the natural gas. The combusted gases are kept separate, for post combustion processing prior to discharge to the atmosphere.

Figure 1:
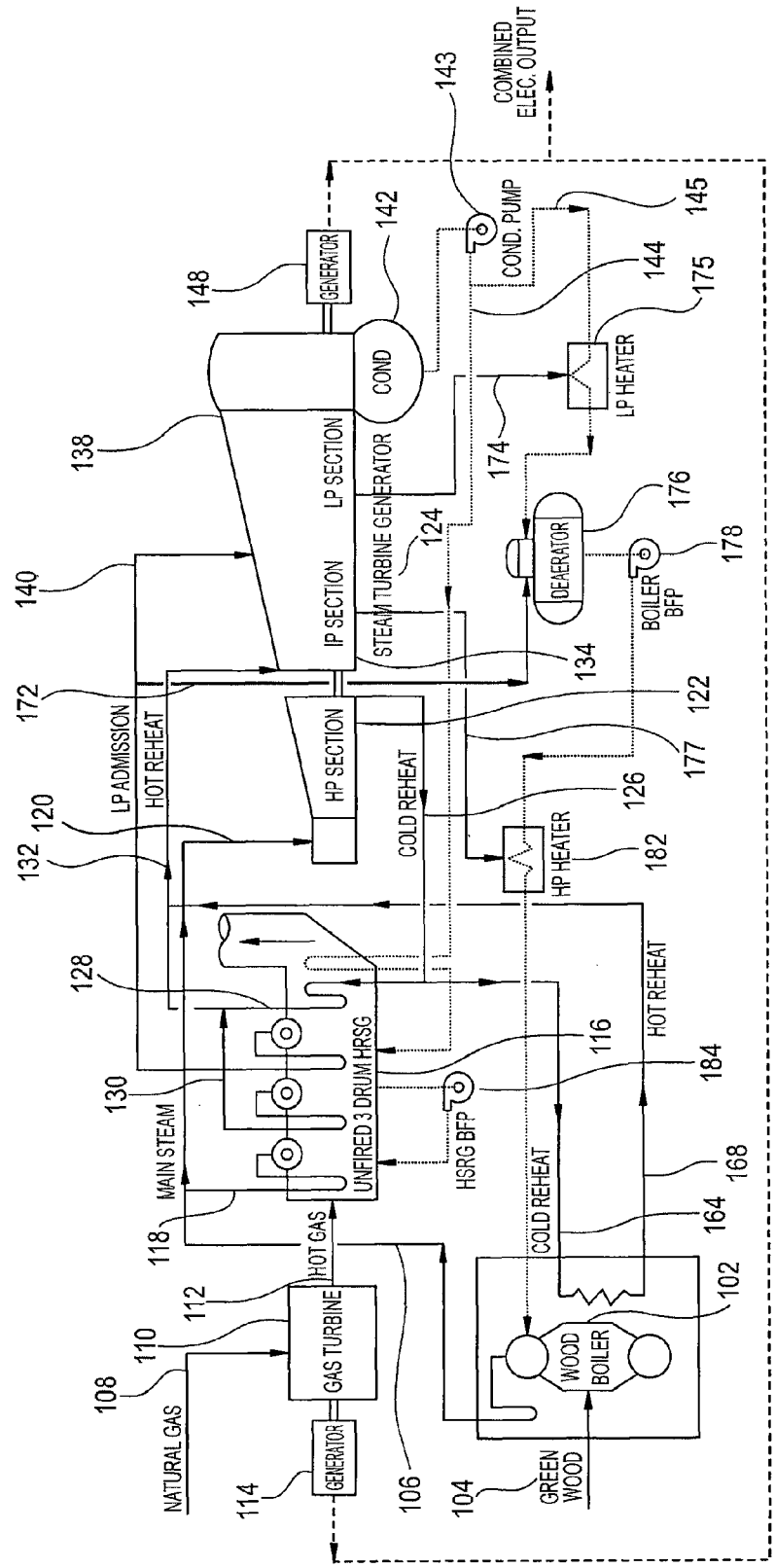
FIG. 1 is a first exemplary embodiment of the hybrid cycle of the present disclosure.
Figure 2:
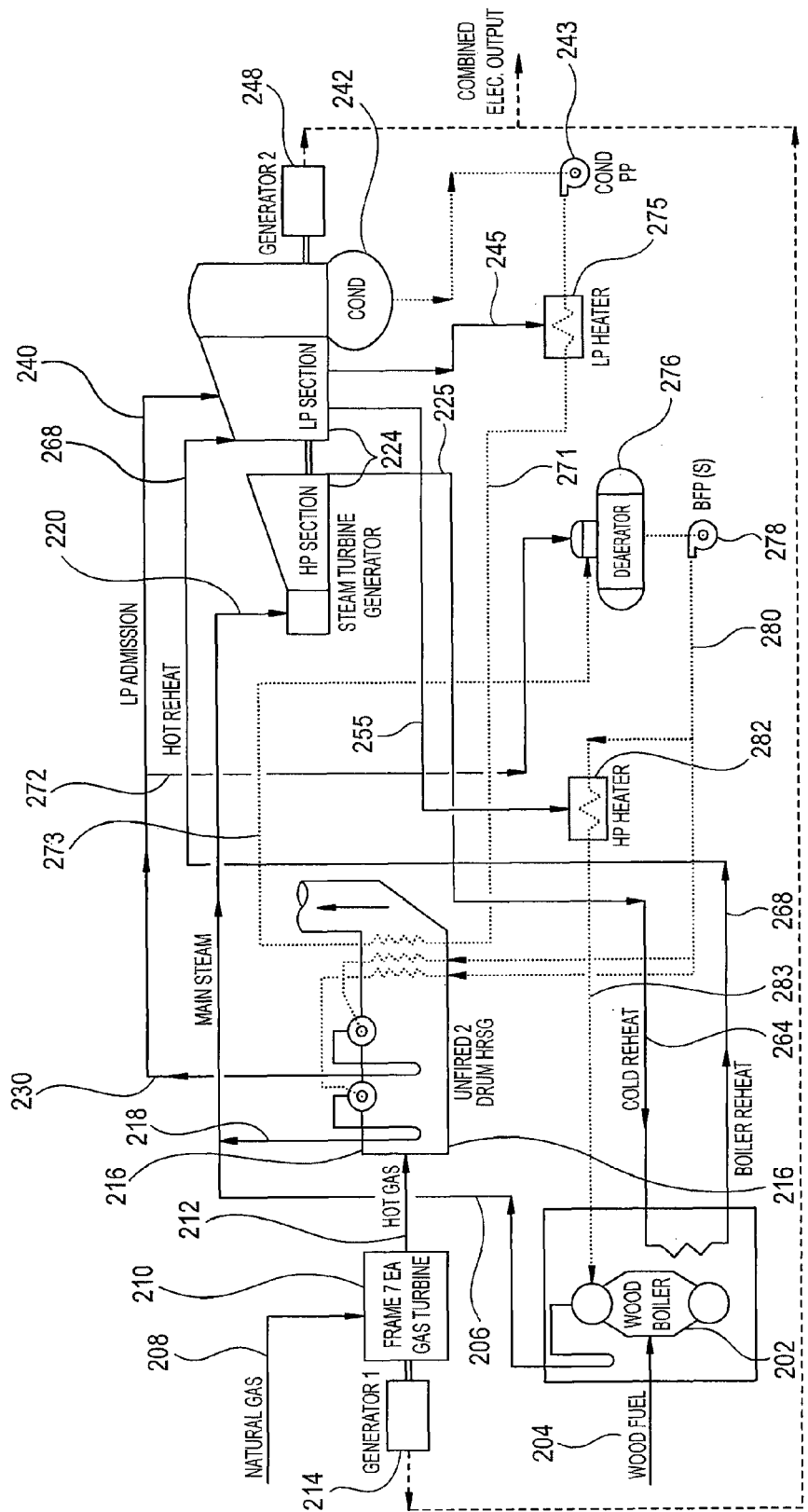
FIG. 2 is a second exemplary embodiment of the hybrid cycle of the present disclosure.

In a preferred embodiment such as that shown in FIGS. 1 and 2, the biomass fired boiler operates in parallel with the combined cycle heat recovery boiler (HRSG). This has several effects. First, the operating steam pressure of the biomass boiler is no longer limited by the size of the steam turbine generator. Second, the steam from the biomass boiler can now operate in a reheat (or non reheat) type Rankine cycle. Third, a separate power generation cycle for the biomass fuel is avoided thereby resulting in capital economy, improved efficiency, and avoidance of separate operation staff. Fourth, the steam produced from the biomass fuel resource can displace the use of natural gas or fossil fuel as a supplemental fuel in the HRSG.

Typically, biomass processes are limited to using industrial class steam turbine generators. The combination of cycles described in the present disclosure permits the use of utility class steam turbine generators. Because utility class steam turbine generators are markedly more efficient than industrial class steam turbine generators, the ability to use a utility class steam turbine generator provides further efficiencies to the present system and methods over traditional systems for generation of electrical power from biomass.

A wide variety of biomass products can be used with the invention of the present disclosure. The fuel or feedstock can comprise any of renewable solid fuels such as green tree chips, forest residues, yard clippings, wood chips, urban waste wood, construction and demolition waste wood, sugar cane fiber (bagasse), or other agricultural waste.

The concepts of the present disclosure can also be used with high chlorine content fuels such as municipal solid waste (MSW) or refuse derived fuels (RDF). In applications using high chlorine content fuels, the steam temperature of the cycle will be reduced as compared to low chlorine content fuels. Tires could also be used. The present disclosure provides exemplary sources of biomass energy fuels, but the scope of the present disclosure is not limited to these specific examples. To the contrary, any biomass fuel source that is capable of producing steam temperatures compatible with the natural gas or other fossil fuel cycle can be used. The biomass fuel may be brought to the plant site by any means known in the art such as truck, train, or barge and be unloaded, stored and reclaimed in the same manner as is the current practice in biomass operations.

High pressure steam can be generated from biomass fuel using any method known in the art. For example, the use of stoker firing, bubbling fluid bed, circulating fluid bed technology and the like are all within the scope of this disclosure. In a preferred embodiment, the steam boiler operating pressure and temperature will be at the high end of current practice so that the steam pressure and temperature derived from the biomass fuel cycle are on the same order as the steam pressure and temperature of the natural gas or fossil fuel cycle. In general, the steam generation process for the biomass fuel portion of the combined cycle will operate in a similar manner to ongoing biomass fuel power generation projects with the exception that the steam is not directly routed to a dedicated steam turbine generator. Instead, as will be discussed further below, the steam generated from the biomass fuel portion is combined with steam generated from the natural gas or fossil fuel cycle and the combined steam flow is routed to the steam turbine generator. Steam generated from natural gas or fossil fuel can be obtained by any means known in the art and the present disclosure is not limited to any specific method.

An exemplary embodiment of the present disclosure is shown in FIG. 1. FIG. 1 depicts an exemplary wood boiler 102 using green wood as a feedstock, but, as described above, the concepts of this disclosure are not limited to the use of a wood boiler or green wood as a feedstock. Using processing methods standard in the industry and readily known to those of skill in the art, green wood 104 is processed in wood boiler 102 to produce steam.

Natural gas 108 is processed through a gas turbine 110 to produce hot gas 112. The processing of natural gas 108 also creates energy, via generator 114. Hot gas 112 is produced from gas turbine 110. Hot gas 112 then enters a heat recovery steam generator (HRSG) unit 116. In the exemplary embodiment of FIG. 1, HRSG 116 is an unfired three drum HRSG. The high pressure steam output 118 from HRSG 116 is combined with the steam output 106 from the wood boiler 102. The combined steam flow 120 is then routed to a high pressure (HP) section 122 of the steam turbine generator 124.

After expanding to a lower pressure in the HP section 122 of the steam turbine generator 124, the steam 126 preferably enters a reheat cycle. If the system is operating in hybrid mode with both the natural gas and the biomass boiler in operation, the steam 126 can be routed to one of two destinations. First, the cold reheat steam 126 can be routed to the HRSG 116 for reheating. The reheated steam 128 then combines with a second steam output (intermediate pressure) 130 from the HRSG 116 as part of steam line 132. Second, a portion of the cold reheat steam 126 can be routed along steam line 164 to the biomass boiler 102 for reheating. Following reheating in the biomass boiler 102, the hot reheat travels along steam line 168 to be combined with steam line 132. If the system is operating only in biomass mode, all of the cold reheat steam 126 is routed for reheating to the biomass boiler 102. In this mode of operation, once reheated, the hot reheat is routed along steam line 168 to steam line 132. The reheat cycle improves the performance of the steam turbine generator 124 and provides an added level of efficiency to the systems and methods disclosed herein. In either the hybrid mode of operation or the biomass only mode, steam line 132 is routed to the intermediate pressure section of the steam turbine generator 124. The steam is then expanded to the low pressure section 138 of the steam turbine generator 124 to generate electrical power via generator 148. Preferably, the HRSG 116 further includes a low pressure admission line 140 that provides steam input to the low pressure section 138.

The steam exiting the low pressure section 138 of the steam turbine generator 124 passes over a condenser 142 where it is condensed to feedwater. From the condenser, the feedwater enters the condensate pump 143 and is pumped to two destinations if the system is operating in the hybrid mode of operation. First, the feedwater is pumped via line 144 through an economizer section in the HRSG 116 for preheating and then to the low pressure drum of the HRSG. The low pressure drum supplies water via a boiler feed pump 184 into the intermediate pressure and high pressure sections of the HRSG for steam production. Second, the feedwater is pumped via line 145 through a low pressure feedwater heater 175 with heat input 174 supplied from the low pressure steam turbine extraction. From the low pressure feedwater heater 175, the feedwater is routed to a deaerator 176 having a heat input 172 supplied from a feed line from the low pressure admission line 140. The feedwater, upon exiting the deaerator 176, is pumped via a boiler feed pump 178, through a high pressure feedwater heater 182 to the biomass boiler 102. The high pressure feedwater heater 182 receives a heat input from an intermediate pressure steam turbine extraction 177. The feedwater is then heated for steam generation in the wood boiler 102. If the system is operating only in biomass mode, all of the feedwater is routed to the biomass boiler 102.

In a second exemplary embodiment, depicted in FIG. 2, natural gas 208 is processed in gas turbine 210 to produce hot gas 212. An unfired two drum HRSG 216 receives the hot gas 212 and creates a high pressure steam output 218 and a low steam pressure steam output 230. The high pressure steam output 218 is combined with the steam output 206 from a wood boiler 202 created from the processing of wood fuel 204 or other biomass fuel. The combined steam flow 220 is then routed to a high pressure section of the steam turbine generator 224.

After expanding to a lower pressure in the high pressure section of the steam turbine generator 224, the steam enters a reheat cycle. Cold reheat steam line 225 routes all of the steam to the wood boiler 202. The boiler reheat 268 is then routed to the low pressure section of the steam turbine generator 224. The low pressure section of the steam turbine generator also receives the low pressure admission steam output 230 from the HRSG 216. The steam is then expanded in the low pressure section of the steam turbine generator 224 to generate electrical power via generator 248.

The condenser 242 receives the output of the low pressure section of the steam turbine generator 224. The steam exiting the low pressure section is condensed to feedwater and enters the condensate pump 243. The output from the condensate pump 243 is routed to a low pressure heater 275 and then through an economizer section in the HRSG 216. The low pressure heater 275 receives a heat input from a low pressure extraction line 245. After leaving the HRSG 216, the feedwater is routed to a deaerator 276 which receives a heat input from the low pressure admission line. From the deaerator, the feedwater is routed by a boiler feed pump 278 to two destinations if the system is operating in hybrid mode. First, the feedwater is routed to the HRSG economizers for heating and generation of high pressure and low pressure steam. Second, the feedwater enters a high pressure heater 282 and is routed to the wood boiler 202 to be heated for steam generation. The high pressure heater 282 receives a heat input from the low pressure steam turbine extraction 255. If the system is operating in biomass only mode, all of the feedwater is directed through the heaters and then to the wood boiler 202.

The examples shown do not use any supplemental firing in the HRSG. The use of supplemental firing in the HRSG can be used to replace the biomass steam source, when the biomass portion of the plant is out of service for maintenance. This allows the electrical output of the plant to be maintained, when the biomass plant is not operating.

Various combustion turbine manufacturers offer predesigned fossil fuel based combined cycle packages, with the combustion turbine(s) as the prime mover for the combined cycle. The larger the combustion turbine, the more complex the combined cycle design. The intent of this complexity is to improve the overall efficiency of the power generation cycle.

Using the above approach and other optimization features, combined cycle power plants are able to achieve electrical production efficiencies approaching 50%. On the other hand, traditional renewable biomass fired power plants operate in the 23-25% efficiency range.

The hybrid concept is not limited to any specific combined cycle arrangement. For purposes of this example, a biomass fired boiler was combined with an unfired three drum HRSG (FIG. 1) or unfired two drum HRSG (FIG. 2) and a single, three section (FIG. 1) or two section (FIG. 2), condensing steam turbine generator with or without steam extractions. In other circumstances, solid fuel boilers could be used or other fossil fuel fired generation technologies utilizing a steam cycle could be used such as, but not limited to, a coal boiler, gas boiler or oil boiler. In addition, the cycle can be used in cogeneration applications where steam created in the combined cycle and hybrid cycle are used in part, for industrial purposes. Furthermore, the hybrid concept is not limited to a reheat based, combined cycle.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for generating renewable biomass electrical power from existing power facilities comprising:
    processing a first energy source in a turbine to produce electricity via a coupled generator, a first exhaust combusted gas, and a by-product first steam flow via a coupled heat recovery steam generator;
    processing a biomass fuel source in a biomass boiler, separately from the processing of the first energy source and the first exhaust combusted gas, to produce a second steam flow at matched temperature and pressure conditions to the by-product first steam flow, wherein the biomass fuel source is different than the first energy source and the matched temperature and pressure conditions are adjustable based on temperature and pressure conditions for the by-product first steam flow or the second steam flow;
    combining the by-product first steam flow and the second steam flow, wherein the steam flows are combined after the by-product first steam flow is processed through the heat recovery steam generator and the combined steam flow is at or below a maximum flow of the by-product first steam flow produced from the first energy source via the coupled heat recovery steam generator;
    routing the combined steam flow through a steam turbine generator;
    recirculating a first portion of an output of the steam turbine generator for reheating in the biomass boiler;
    reheating the first portion of the output in the biomass boiler to generate a first reheated steam; and
    delivering the first reheated steam to the steam turbine generator.

2. The method of claim 1 wherein the steam turbine generator comprises two or more sections and the first portion of the output is obtained from a first section of the steam turbine generator and the reheated steam is delivered to a second section of the steam turbine generator.

3. The method of claim 1 further comprising:
recirculating a second output of the steam turbine generator for reheating in the coupled heat recovery steam generator of the turbine to generate a second reheated steam; and
delivering the second reheated steam to the steam turbine generator.

4. The method of claim 1 further comprising:
collecting water at a condenser;
heating the water; and
using the heated water for the processing of the first energy source and the biomass fuel source.

5. The method of claim 1 wherein the first energy source is selected from group consisting of natural gas, fossil fuel, coal, and solid fuel.

6. The method of claim 1 wherein the biomass fuel source is selected from one or more of the group of green tree chips, forest residues, yard clippings, wood chips, urban waste wood, construction and demolition waste wood, sugar cane fiber, tires, municipal solid waste, refuse derived fuels, and agricultural waste.

7. The method of claim 1 wherein the steam turbine generator is a utility grade steam turbine generator.

8. The method of claim 1 wherein the turbine is connected to the heat recovery steam generator.

9. A method for generating renewable biomass electrical power from existing power facilities comprising:
processing a first energy source in a turbine to produce electricity via a coupled generator, a first exhaust combusted gas, and a by-product first steam flow via a coupled heat recovery steam generator;
processing a biomass fuel source, separately from the processing of the first energy source and the first exhaust combusted gas, to produce a second steam flow at matched temperature and pressure conditions to the by-product first steam flow and the matched temperature and pressure conditions are adjustable based on temperature and pressure conditions for the by-product first steam flow or the second steam flow;
combining the by-product first steam flow and the second steam flow, wherein the steam flows are combined after the by-product first steam flow is processed through the heat recovery steam generator and the combined steam flow is at or below a maximum flow of the by-product first steam flow produced from the first energy source via the coupled heat recovery steam generator;
routing the combined steam flow through a steam turbine generator;
recirculating a first portion of the output of the steam turbine generator for reheating in the biomass boiler to generate a first reheated steam;
delivering the first reheated steam to the steam turbine generator;
collecting water at a condenser;
heating the water; and
delivering the heated water as feed water for the processing in the first energy source and the biomass fuel source.

10. The method of claim 9 further comprising:
recirculating a second output of the steam turbine generator for reheating in the coupled heat recovery steam generator of the turbine to generate a second reheated steam; and
delivering the second reheated steam to the steam turbine generator.

11. A system for generating electricity comprising:
a first component for producing, from a first energy source, electricity via a coupled generator, a first exhaust combusted gas, and a by-product first steam flow via a coupled heat recovery steam generator;
a second component for producing, separately from the processing of the first energy source and the first exhaust combusted gas, a second steam flow from a biomass fuel source at matched temperature and pressure conditions to the by-product first steam flow, wherein the biomass fuel source is different than the first energy source and the matched temperature and pressure conditions are adjustable based on temperature and pressure conditions for the by-product first steam flow or the second steam flow;
a steam line which combines the by-product first and second steam flows, wherein the steam flows are combined after the by-product first steam flow is processed through the heat recovery steam generator and the combined steam flow is at or below a maximum flow of the by-product first steam flow produced from the first energy source via the coupled heat recovery steam generator;
a steam turbine generator which extracts energy from the combined steam flow; and
a reheat steam line loop for reheating a first portion of an output in the biomass boiler to generate reheated steam, wherein the first portion of the output is received from a first section of the steam turbine generator and the reheated steam is delivered to a second section of the steam turbine generator.

12. The system of claim 11 further comprising: a second reheat steam line loop for reheating a second portion of the output in the first component to generate a second reheated steam, wherein the second reheated steam is delivered to the second section of the steam turbine generator.

13. The system of claim 11 further comprising a condenser.

14. The system of claim 11 wherein the first energy source is selected from the group consisting of natural gas, fossil fuel, coal, and solid fuel.

15. The system of claim 11 wherein the biomass fuel source is selected from one or more of the group of green tree chips, forest residues, yard clippings, wood chips, urban waste wood, construction and demolition waste wood, sugar cane fiber, tires, municipal solid waste, refuse derived fuels, and agricultural waste.

16. The system of claim 11 wherein the steam turbine generator is a utility grade steam turbine generator.

* * * * *